United States Patent
Bertsch et al.

(10) Patent No.: US 9,701,035 B2
(45) Date of Patent: Jul. 11, 2017

(54) ADJUSTABLE LOCKING SHOE

(71) Applicant: Milwaukee Electric Tool Corporation, Brookfield, WI (US)

(72) Inventors: Matthew T. Bertsch, New Berlin, WI (US); Melissa M. Marineau, Milwaukee, WI (US); Ryan J. Denissen, Sussex, WI (US); Roger D. Neitzell, Palmyra, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 274 days.

(21) Appl. No.: 14/045,916

(22) Filed: Oct. 4, 2013

(65) Prior Publication Data

US 2014/0033548 A1 Feb. 6, 2014

Related U.S. Application Data

(60) Division of application No. 12/794,023, filed on Jun. 4, 2010, now Pat. No. 8,549,760, which is a (Continued)

(51) Int. Cl.
*B27B 13/00* (2006.01)
*B26D 1/54* (2006.01)
(Continued)

(52) U.S. Cl.
CPC .............. *B26D 1/54* (2013.01); *B23D 53/12* (2013.01); *B23D 55/00* (2013.01); *Y10T 83/7264* (2015.04)

(58) Field of Classification Search
CPC ......... B23D 53/12; B23D 55/00–55/10; B27B 13/00
See application file for complete search history.

(56) References Cited

U.S. PATENT DOCUMENTS 1,482,954 A * 2/1924 Tideman .................... A47L 5/34
16/19
1,530,682 A 3/1925 Lyman
(Continued)

FOREIGN PATENT DOCUMENTS

JP 2001300819 10/2001
JP 2004345041 12/2004

OTHER PUBLICATIONS

Milwaukee Deep Cut Saw Model 6230N, Operator's Manual, known at least as early as Sep. 15, 2009, 13 pgs.
(Continued)

*Primary Examiner* — Stephen Choi
(74) *Attorney, Agent, or Firm* — Michael Best & Friedrich LLP

(57) ABSTRACT

A shoe for a band saw includes a block for coupling to the band saw, the block having an aperture, a locking ball disposed in the aperture, a body including a first surface for engaging a workpiece and an opposite surface having plurality of recesses, and a locking rod coupled to the block and movable between a first position and a second position. The locking ball is received in one of the plurality of recesses of the body when the locking rod is in the first position such that the body is fixed relative to the block, and the body is movable relative to the block when the locking rod is in the second position.

20 Claims, 14 Drawing Sheets

Related U.S. Application Data continuation-in-part of application No. 12/508,824, filed on Jul. 24, 2009, now Pat. No. 8,549,759.

(60) Provisional application No. 61/083,703, filed on Jul. 25, 2008.

(51) Int. Cl.
*B23D 53/12* (2006.01)
*B23D 55/00* (2006.01)

(56) References Cited

U.S. PATENT DOCUMENTS

| | | | |
|---|---|---|---|
| 2,591,999 A | 4/1952 | Barham, Sr. | |
| 2,596,081 A | 5/1952 | Sacrey | |
| 2,800,933 A * | 7/1957 | Michael | B23Q 9/0028 30/373 |
| 2,916,062 A | 12/1959 | Clauson | |
| 3,309,050 A | 3/1967 | Blink et al. | |
| 3,462,171 A | 8/1969 | Mitty et al. | |
| 3,553,802 A * | 1/1971 | Stanley | D02G 1/12 28/268 |
| 3,825,355 A | 7/1974 | Martin | |
| 4,001,937 A | 1/1977 | Stelljes et al. | |
| 4,012,158 A | 3/1977 | Harper | |
| 4,023,572 A * | 5/1977 | Weigand | A61B 17/1666 30/276 |
| 4,036,525 A | 7/1977 | Howk | |
| 4,320,680 A | 3/1982 | de la Cruz et al. | |
| 5,720,096 A | 2/1998 | Doersey | |
| 5,727,322 A | 3/1998 | Giacometti | |
| 5,755,148 A | 5/1998 | Stumpf et al. | |
| 5,779,724 A * | 7/1998 | Werner | A61B 17/3211 30/162 |
| 5,943,931 A | 8/1999 | Stumpf et al. | |
| 5,957,022 A | 9/1999 | Stumpf et al. | |
| 6,202,311 B1 * | 3/2001 | Nickels, Jr. | B27B 9/02 30/376 |
| 6,418,830 B1 | 7/2002 | Stumpf et al. | |
| 6,425,309 B1 | 7/2002 | Stumpf et al. | |
| 6,671,969 B2 | 1/2004 | Phillips et al. | |
| 6,829,830 B2 | 12/2004 | O'Banion | |
| RE40,349 E | 6/2008 | Blum et al. | |
| 7,395,603 B2 | 7/2008 | Sugiura et al. | |
| 7,424,779 B2 | 9/2008 | Tozawa et al. | |
| 7,426,786 B2 | 9/2008 | Beville et al. | |
| 7,434,502 B2 | 10/2008 | Keeton et al. | |
| 7,437,824 B2 | 10/2008 | Chreene et al. | |
| 7,441,487 B2 | 10/2008 | Liu et al. | |
| 7,497,017 B2 | 3/2009 | Bone et al. | |
| D627,203 S | 11/2010 | Serdynski et al. | |
| 7,926,187 B2 | 4/2011 | Uehlein-Proctor et al. | |
| 8,549,759 B2 | 10/2013 | Bertsch et al. | |
| 8,549,760 B2 | 10/2013 | Bertsch et al. | |
| 8,640,346 B2 * | 2/2014 | Allen | B27B 9/02 30/376 |
| 2001/0001375 A1 | 5/2001 | Meredith et al. | |
| 2004/0020061 A1 | 2/2004 | O'Banion | |
| 2004/0158996 A1 | 8/2004 | McIntosh | |
| 2005/0000338 A1 | 1/2005 | Wascow | |
| 2005/0093359 A1 | 5/2005 | Hobb et al. | |
| 2005/0183271 A1 | 8/2005 | Sugiura et al. | |
| 2005/0283984 A1 | 12/2005 | Walmsley | |
| 2006/0288591 A1 | 12/2006 | Chreene et al. | |
| 2007/0000137 A1 | 1/2007 | Beville et al. | |
| 2008/0047150 A1 | 2/2008 | Phillips et al. | |
| 2008/0148915 A1 | 6/2008 | Nickels et al. | |
| 2008/0172891 A1 | 7/2008 | Nie | |
| 2008/0224514 A1 | 9/2008 | Zink et al. | |
| 2008/0235961 A1 | 10/2008 | Chreene et al. | |
| 2009/0025520 A1 | 1/2009 | Heinrichs et al. | |
| 2009/0071017 A1 | 3/2009 | Gehret | |
| 2009/0113727 A1 | 5/2009 | Chen | |
| 2009/0205211 A1 | 8/2009 | Nickels, Jr. et al. | |
| 2009/0241353 A1 | 10/2009 | Ericson et al. | |
| 2009/0265943 A1 | 10/2009 | Miller et al. | |
| 2009/0277315 A1 | 11/2009 | Ipatenco et al. | |
| 2009/0301278 A1 | 12/2009 | Agan et al. | |
| 2011/0083330 A1 * | 4/2011 | Steele | B23D 49/167 30/374 |

OTHER PUBLICATIONS

Milwaukee Deep Cut Saw Model 6230N, Service Parts List, Nov. 2011, 2 pgs.
Milwaukee Cordless Band Saw Model 0729-20, Service Parts List, Feb. 2009, 2 pgs.
Milwaukee Cordless Band Saw Model 0729-20, Operator's Manual, Jul. 2008, 28 pgs.
Makita 2107F Portable Band Saw, Instruction Manual, known at least as early as Sep. 15, 2009, 24 pgs.
Makita 2107F Portable Band Saw, Parts Breakdown, known at least as early as Sep. 15, 2009, 4 pgs.
Office Action from the U.S. Appl. No. 12/508,824 dated Jun. 22, 2012 (7 pages).
Final Rejection from the U.S. Appl. No. 12/508,824 dated Dec. 5, 2012 (6 pages).

* cited by examiner

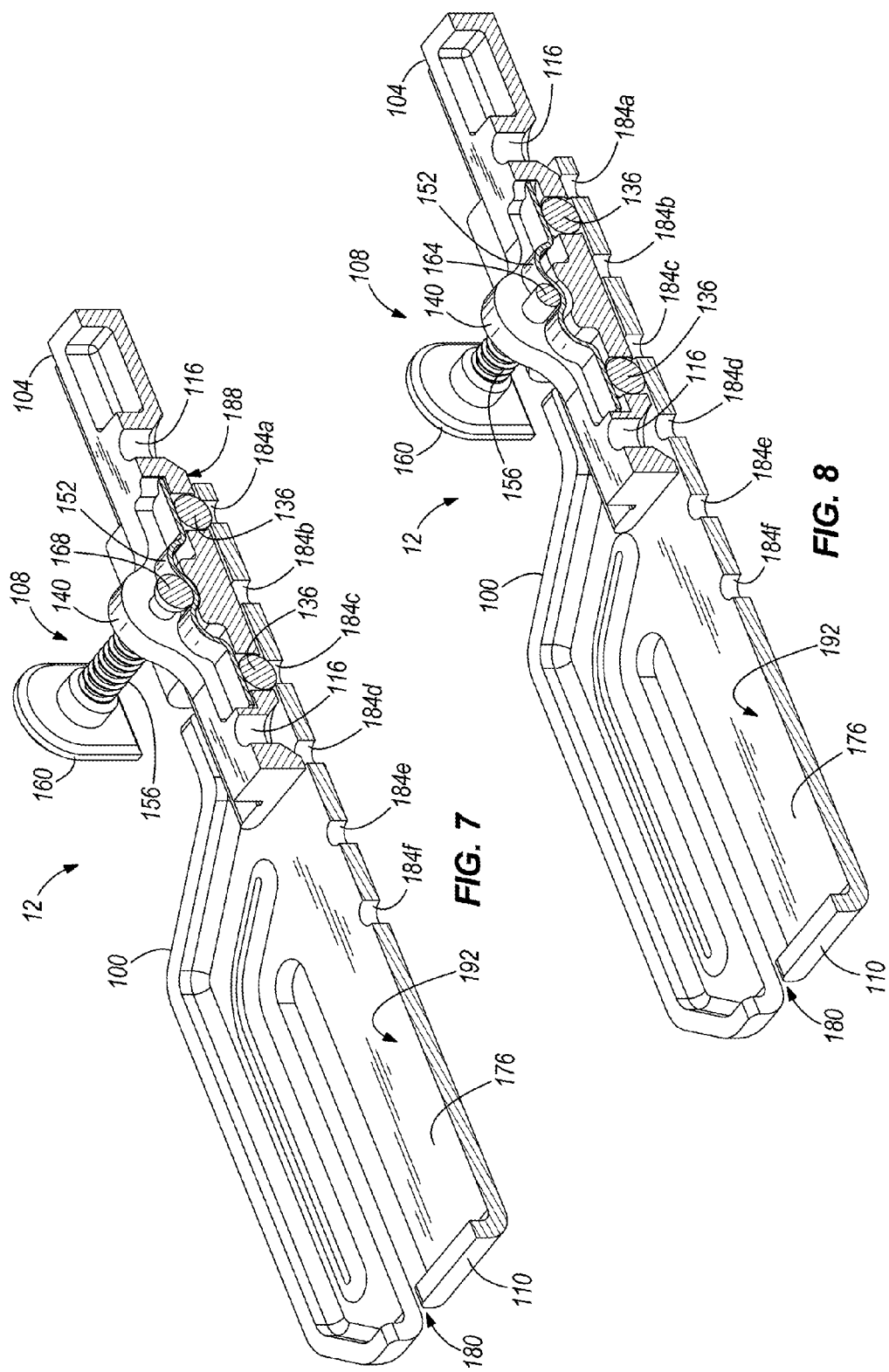

ADJUSTABLE LOCKING SHOE

CROSS-REFERENCE TO RELATED APPLICATIONS

This application is a divisional of U.S. patent application Ser. No. 12/794,023 filed on Jun. 4, 2010, which is a continuation-in-part of U.S. patent application Ser. No. 12/508,824 filed on Jul. 24, 2009, which claims priority to U.S. Provisional Patent Application Ser. No. 61/083,703 filed on Jul. 25, 2008, the entire contents of all of which are incorporated herein by reference.

BACKGROUND

The present invention relates to a shoe for a saw, and, more particularly, to a shoe for a band saw.

Shoes for reciprocating saws typically include a flat or planar surface for engaging a workpiece. The planar surface is positioned normal to a blade of the reciprocating saw. The reciprocating saw is held by a user and positioned by the user with respect to the workpiece. The shoe does not aid in locating the tool with respect to the workpiece, but acts as a stop to limit the depth of the saw blade into the workpiece and to prevent the workpiece from engaging the saw blade at a connection of the saw blade to the tool.

Band saw shoes, or workpiece bumpers, typically include a flat or planar surface for engaging a workpiece. The flat surface lies normal to a portion of a saw blade located in a cut zone of the saw where the workpiece is cut. As such, a band saw shoe guides the workpiece with respect to the tool such that a perpendicular cut is made through the workpiece.

SUMMARY

In one construction, the invention provides a shoe for a band saw. The shoe includes a block for coupling to the band saw, the block having an aperture, a locking ball disposed in the aperture, a body including a first surface for engaging a workpiece and an opposite surface having plurality of recesses, and a locking rod coupled to the block and movable between a first position and a second position. The locking ball is received in one of the plurality of recesses of the body when the locking rod is in the first position such that the body is fixed relative to the block, and the body is movable relative to the block when the locking rod is in the second position.

In another construction the invention provides a band saw. The band saw includes a housing supporting a motor operable to drive a continuous band saw blade to cut a workpiece, the housing having a first portion and a second portion, and a cavity between the first portion and the second portion for receiving the continuous band saw blade and accommodating a workpiece during a cutting operation. The band saw also includes a shoe assembly coupled adjacent the cavity to the first portion of the housing. The shoe assembly includes a block coupled to the band saw housing, the block including an aperture, the shoe assembly also including a locking ball disposed in the aperture, and a body. The body has a first surface for engaging a workpiece, an opposite surface having a plurality of recesses, and a recess through which the band saw blade passes. The shoe assembly also includes a locking rod coupled to the block and movable between a first position and a second position. The locking ball is received in one of the plurality of recesses of the body when the locking rod is in the first position such that the body is fixed relative to the block, and the body is movable relative to the block when the locking rod is in the second position.

In yet another construction, the invention provides a shoe for a band saw. The shoe includes a block for coupling to the band saw, the block including first and second recesses, a body movable relative to the block and including a surface for engaging a workpiece, and a lever pivotable between a first position and a second position and including a button portion and a locking portion. The locking portion is received in one of the recesses when the lever is in the first position such that the body is substantially fixed relative to the block. The body is movable relative to the block when the lever is in the second position.

In yet another construction, the invention provides a band saw. The band saw includes a housing having a first portion and a second portion and supporting a motor operable to drive a continuous band saw blade to cut a workpiece, a cavity between the first portion and the second portion for receiving the continuous band saw blade and accommodating a workpiece during a cutting operation, and a shoe assembly coupled adjacent the cavity to the first portion of the housing. The shoe assembly includes a block for coupling to the band saw, the block including first and second recesses, a body movable relative to the block and including a surface for engaging a workpiece, and a lever pivotable between a first position and a second position and including a button portion and a locking portion. The locking portion is received in one of the recesses when the lever is in the first position such that the body is substantially fixed relative to the block. The body is movable relative to the block when the lever is in the second position.

Other aspects of the invention will become apparent by consideration of the detailed description and accompanying drawings.

BRIEF DESCRIPTION OF THE DRAWINGS

FIG. 7 is a cross section of the adjustable locking shoe system taken along line 7-7 of FIG. 5, the adjustable locking shoe system being in a locked position.

FIG. 8 is a cross section of the adjustable locking shoe system taking along line 7-7 of FIG. 5, the adjustable locking shoe system being in an unlocked position.

Figure 1:
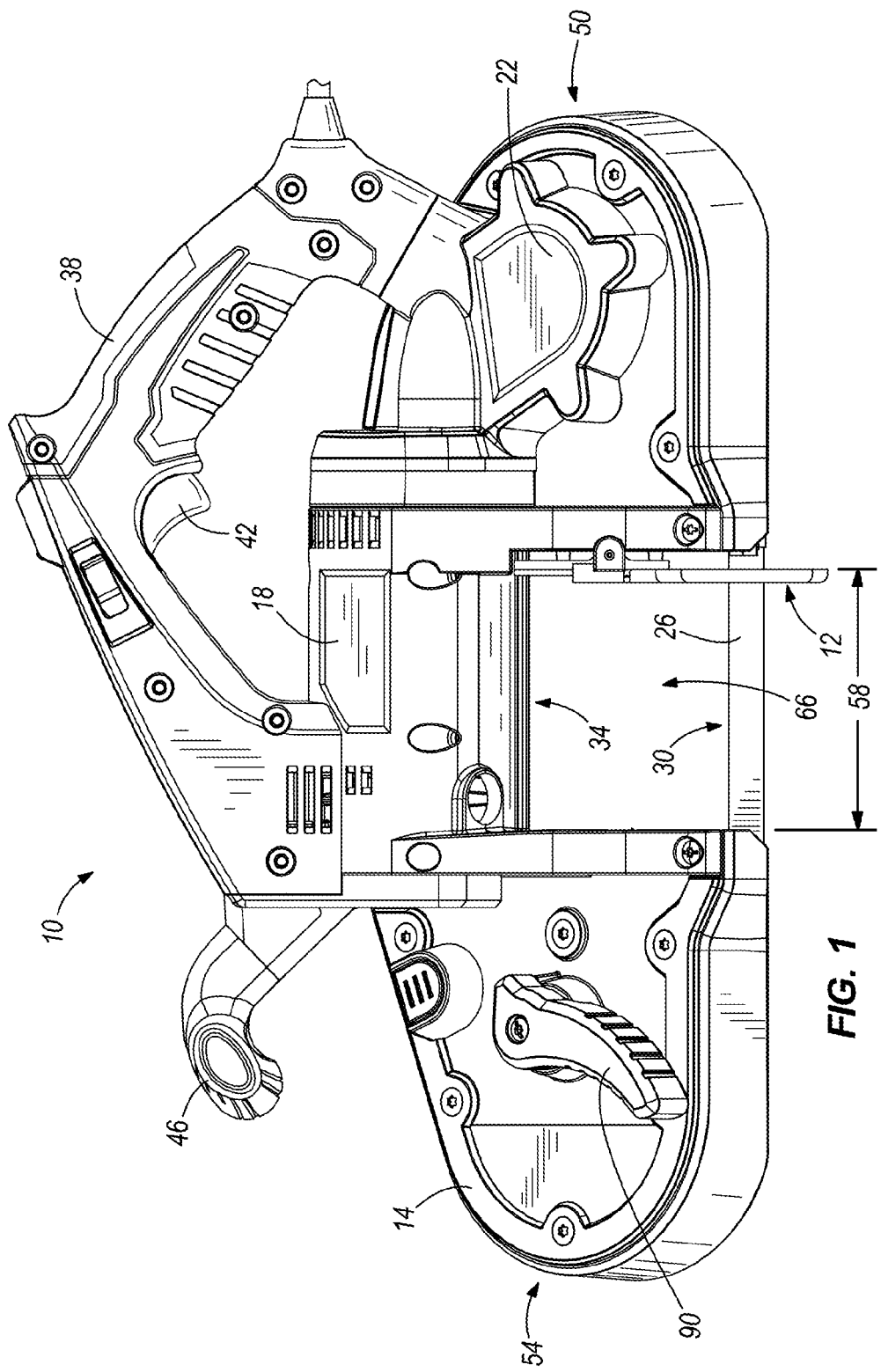
FIG. 1 is a front view of a band saw including an adjustable locking shoe system according to one construction of the invention.

Before any constructions of the invention are explained in detail, it is to be understood that the invention is not limited in its application to the details of construction and the arrangement of components set forth in the following description or illustrated in the following drawings. The invention is capable of other constructions and of being practiced or of being carried out in various ways.

DETAILED DESCRIPTION

FIGS. 1-8 illustrate a band saw 10 and an auto-locking, tool-less adjustable shoe system 12 embodying some aspects of the invention. An AC version of the band saw 10 having an electrical connection cord 12 is illustrated; however, in further constructions, DC versions of the band saw 10 including a rechargeable, removable battery pack are possible.

The band saw 10 includes a housing or frame 14 supporting a motor 18 and a gear box 22. The motor 18 is drivingly connected to a drive mechanism (not shown) at least partially housed within the gear box 22. The motor 18 and the drive mechanism are operable to drive a continuous band saw blade 26 to cut a workpiece. As described herein, the band saw 10 includes a front 30 and a rear 34. The front 30 is defined as the side being proximate the portion of the band saw blade 26 that cuts the workpiece and the rear 34 is defined as the side proximate the portion of the band saw blade 26 that does not cut the workpiece. The rear 34 is otherwise described as being opposite the front 30.

The housing 14 includes a main handle 38 supporting a switch assembly 42 to provide power to the band saw 10. The switch assembly 42 is operable to control operation of the motor 18. The band saw 10 also includes an auxiliary handle 46 for a user's other hand spaced from the main handle 38. Generally, the handles 38, 46 are shaped and arranged for two-handed operation of the band saw 10 as the workpiece is cut. In the illustrated construction, each handle 38, 46 has an ergonomic design to provide comfortable gripping and controlled operation of the band saw. The ergonomic design of each handle and of the combination of the handles may include the orientation or angle of handle(s). The ergonomic design may also include the use of material, such as an elastomeric material, on the handle(s) to, one or more of, provide an improved grip surface, isolate vibration and impacts from the operator, prevent heat build-up and/or transfer to the operator, etc.

The housing 14 defines a first portion 50 and a second portion 54. The first portion 50 and the second portion 54 are spaced apart from one another and define a U-shaped cavity 66 defining a cut zone 58 therebetween. A blade guard 62 (FIG. 2) is positioned at the rear 34 of the band saw 10 and extends between the first and second portions 50, 54 within the cut zone 58. The blade guard 62 provides a recessed area to house the band saw blade 26.

Figure 2:
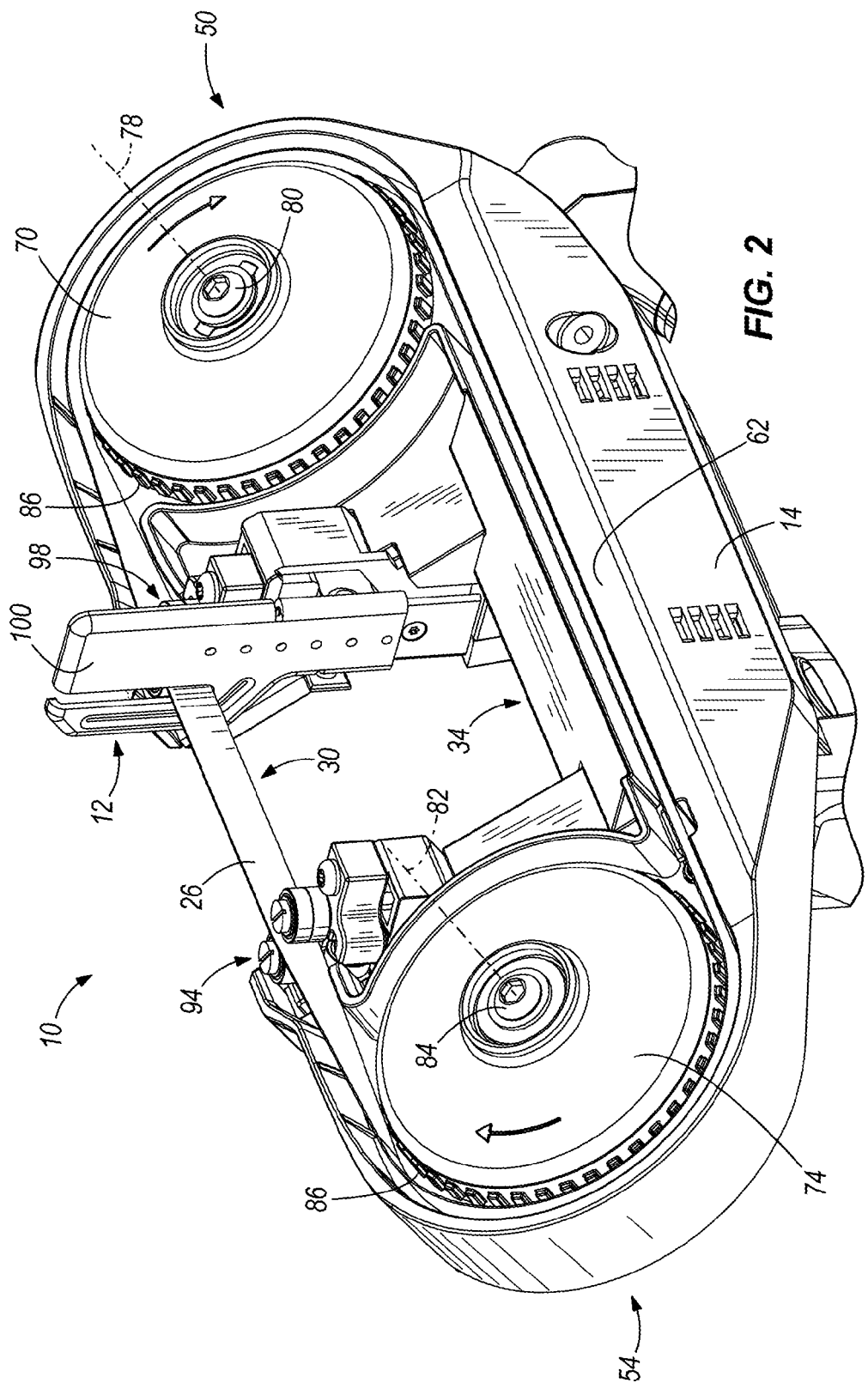
FIG. 2 is a bottom perspective view of the band saw of FIG. 1.

As shown in FIG. 2, the drive mechanism generally includes a drive wheel pulley 70 and a driven wheel pulley 74. The drive wheel 70 rotates about a drive wheel axis 78 defined by a drive wheel axle 80 and is drivingly connected to the motor 18 via a drive train (not shown). The driven wheel 74 rotates about a driven wheel axis 82 defined by a driven wheel axle 84 and is rotatably supported by the housing 14. The drive wheel 70 is positioned in the first portion 50 of the housing 14, and the driven wheel 74 is positioned in the second portion 54 of the housing 14. A wheel tire 86 is coupled to each of the peripheries of the drive wheel 70 and the driven wheel 74. Each wheel tire 86 is a circular-shaped ring formed of a soft and/or flexible elastomeric material that is able to lock or adhere to the respective wheel 70, 74. The band saw blade 26 extends around the drive wheel 70 and the driven wheel 74 and grips the blade tires 86 and, as a result, motion from the drive wheel 70 is transmitted to the band saw blade 26 via the blade tires 86. The band saw 10 also includes a blade tensioning mechanism 90 (FIG. 1) to adjustably provide appropriate tension on the band saw blade 26.

A first guide roller set 94 and a second guide roller set 98 are disposed on each side of the cavity 66 and engage opposing sides of the saw blade 26. The first and second guide roller sets 94, 98 support the band saw blade 26 as the blade 26 enters and exits the cut zone 58. Although the second guide roller set 98 is not entirely visible in FIG. 2, it is substantially a mirror of the first guide roller set 94.

Referring to FIGS. 3-8, the adjustable shoe system 12 includes a shoe 100 for positioning against the workpiece, a connector block 104 for coupling the shoe 100 to the housing 14, and a detent mechanism 108 (FIGS. 6-8) for locking the shoe 100 in select positions relative to the connector block 104. The shoe 100 includes a distal end 110 having a distance from the connector block 104 that varies depending on the position of the shoe 100. The shoe 100 is coupled to the housing 14 by way of the connector block 104 and the detent mechanism 108.

Figure 4:
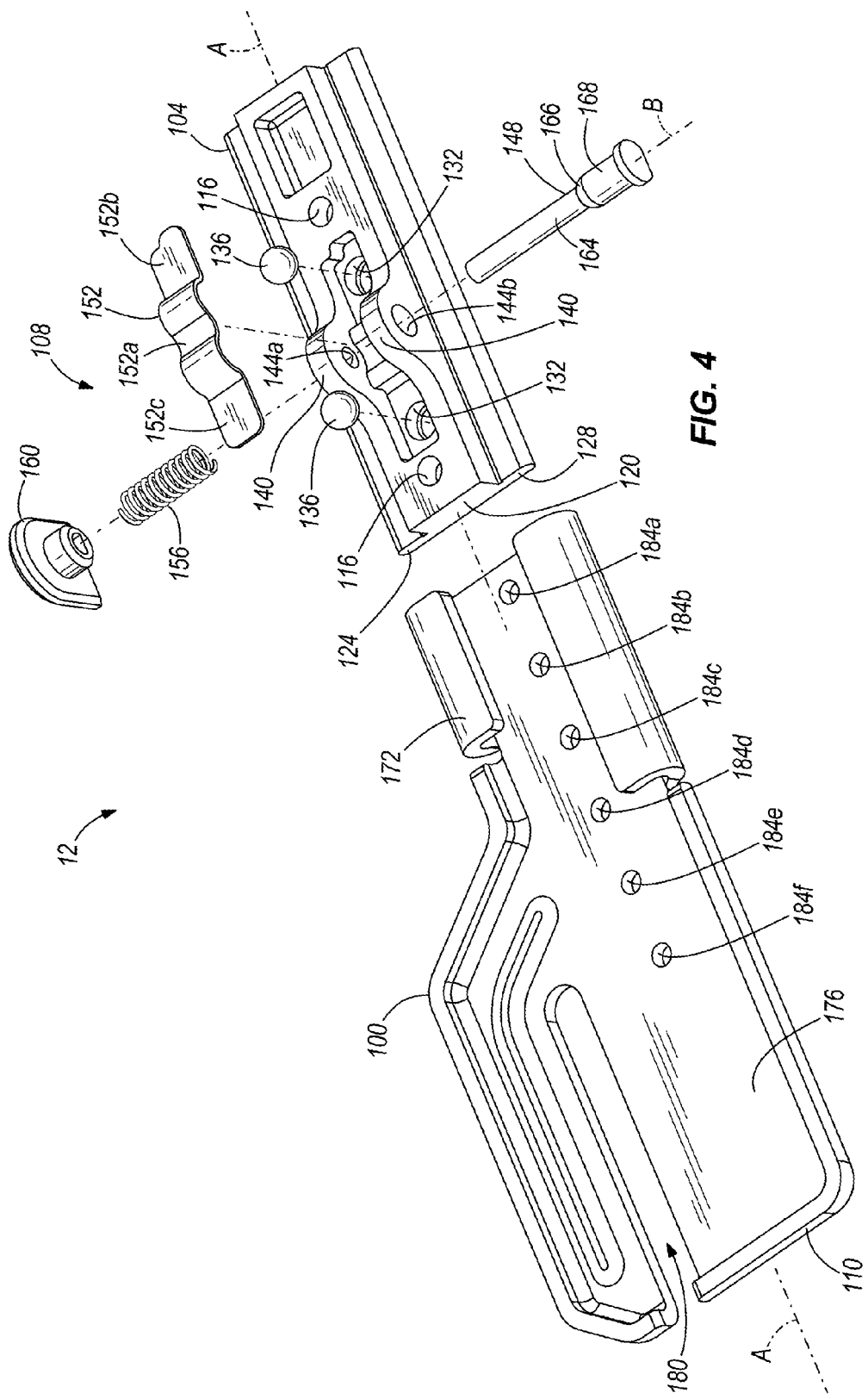
FIG. 4 is an exploded perspective view of the adjustable locking shoe system of FIG. 1.
Figure 5:
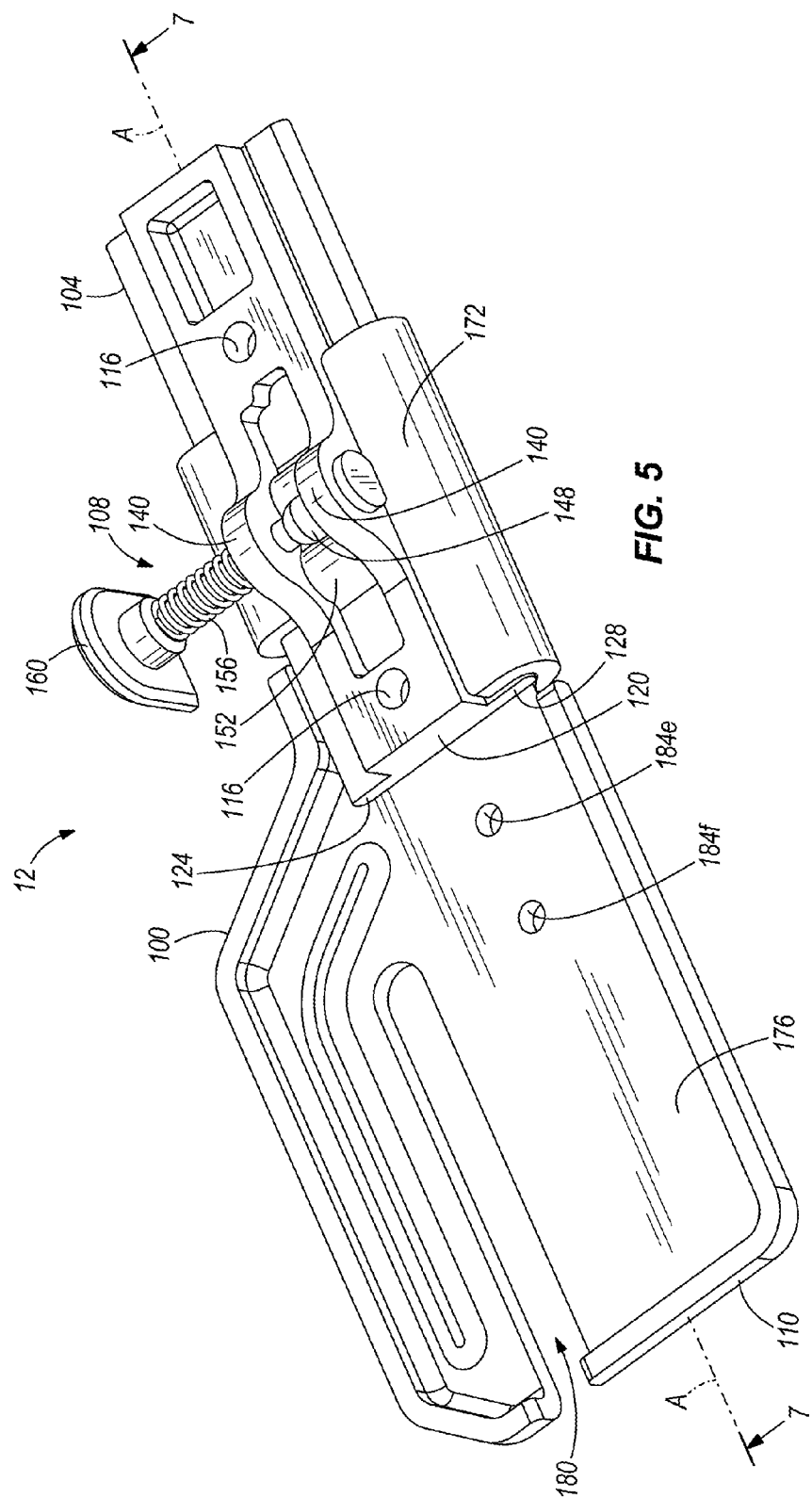
FIG. 5 is a perspective view of the adjustable locking shoe system of FIG. 4.
Figure 6:
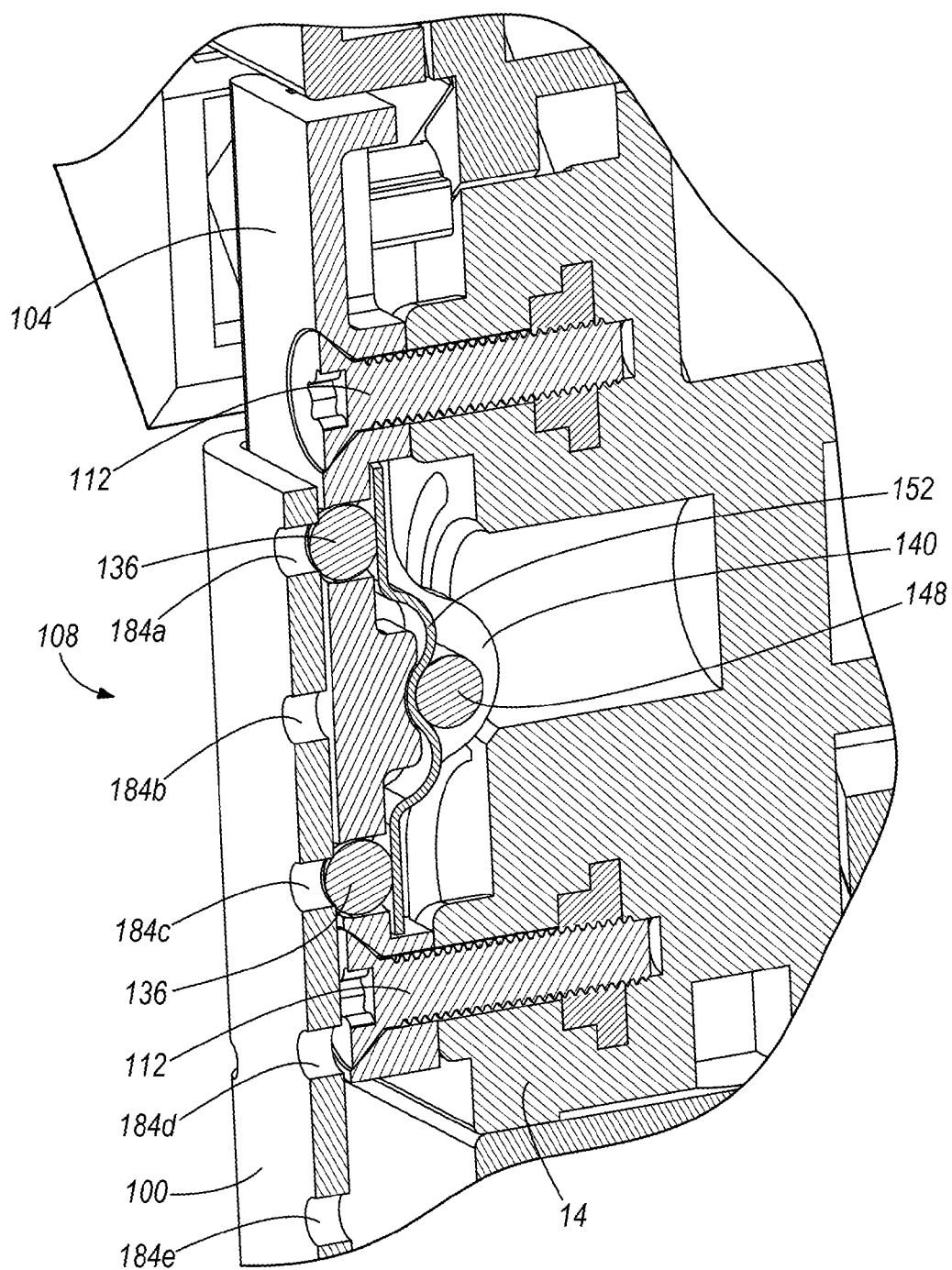
FIG. 6 is a cross section of the adjustable locking shoe system taken along line 6-6 of FIG. 3.

With reference to FIGS. 4 and 5, the connector block 104 is a generally T-shaped member coupled to the housing 14 by fasteners 112 (FIG. 6). The connector block 104 is coupled to the first portion 50 of the housing 14 adjacent the drive wheel 70 and is positioned in or adjacent the cavity 66 at an end of the cut zone 58. The connector block 104 includes fastener apertures 116 through which the fasteners 112 are disposed to couple the connector block 104 to the housing 14. In the illustrated construction, two fastener apertures 116 and two screws 112 are employed. In other constructions, fewer or more fasteners and fastener apertures may be employed to couple the connector block 104 to the housing 14, or the connector block 104 may be integrally formed as one piece with the housing 14. In other constructions, the fasteners 112 may be other suitable types of fasteners.

The connector block 104 includes a main body portion 120 and first and second extending portions or flanges 124, 128 generally forming a T-shaped cross-section, as shown in FIGS. 4-5. In the illustrated construction, the main body portion 120 is positioned adjacent the housing 14 and engages the housing 14 when the connector block 104 is fastened to the housing 14. The first and second extending portions 124, 128 mate with the shoe 100, as described below. The main body portion 120 of the connector block 104 also includes recesses or apertures 132 for receiving locking balls 136, and rod support tabs 140 having apertures 144a, 144b for receiving a locking rod 148 to lock the shoe 100 in place relative to the connector block 104. In the illustrated construction, two locking balls 136 and two apertures 132 are employed. In other constructions, one, three or more locking balls 136 may be employed, and accordingly, one, three or more apertures 132 may be employed to receive the locking balls 136.

The detent mechanism 108 includes the locking balls 136, the locking rod 148, a biasing member 152, such as a leaf spring, a compression spring 156 and a button 160. The biasing member 152 includes a first M-shaped curved portion 152a positioned between a second portion 152b and a third portion 152c (FIG. 4). The locking rod 148 includes a small diameter portion 164, a large diameter portion 168 and a tapered portion 166 transitioning smoothly between the small diameter portion 164 and the large diameter portion 168. The small diameter portion 164 is supported in the aperture 144a. The large diameter portion is supported in the aperture 144b, which accordingly has a larger diameter than the aperture 144a. The button 160 is coupled to a distal end of the small diameter portion 164, and the compression spring 156 is coupled to the small diameter portion 164 of the locking rod 148 between the button 160 and the rod support tab 140.

The compression spring 156 biases the locking rod 148 to a locked position (FIGS. 5 and 7) in which the shoe 100 is fixed relative to the connector block 104. In the locked position, the large diameter portion 168 of the locking rod 148 engages the first portion 152a of the biasing member 152 and applies a force to the biasing member 152 toward the connector block 104, against a spring force of the biasing member 152, to trap the locking balls 136 between the connector block 104 and the first and second portions 152b, 152c of the biasing member 152. The button 160 and the locking rod 148 are extended away from the connector block 104 in the locked position. The button 160 is depressible against the biasing force of the compression spring 156 to an unlocked position (FIG. 8) in which the shoe 100 is movable relative to the connector block 104. In the unlocked position, the small diameter portion 164 of the locking rod 148 is adjacent the biasing member 152, providing a clearance that releases the biasing member 152 and thus the locking balls 136. The biasing member 152 is released to its biased position away from the locking balls 136 such that the locking balls 136 are not trapped between the connector block 104 and the first and second portions 152b, 152c of the biasing member 152. The button 160 and locking rod 148 are positioned closer to the connector block 104 in the unlocked position.

Figure 3:
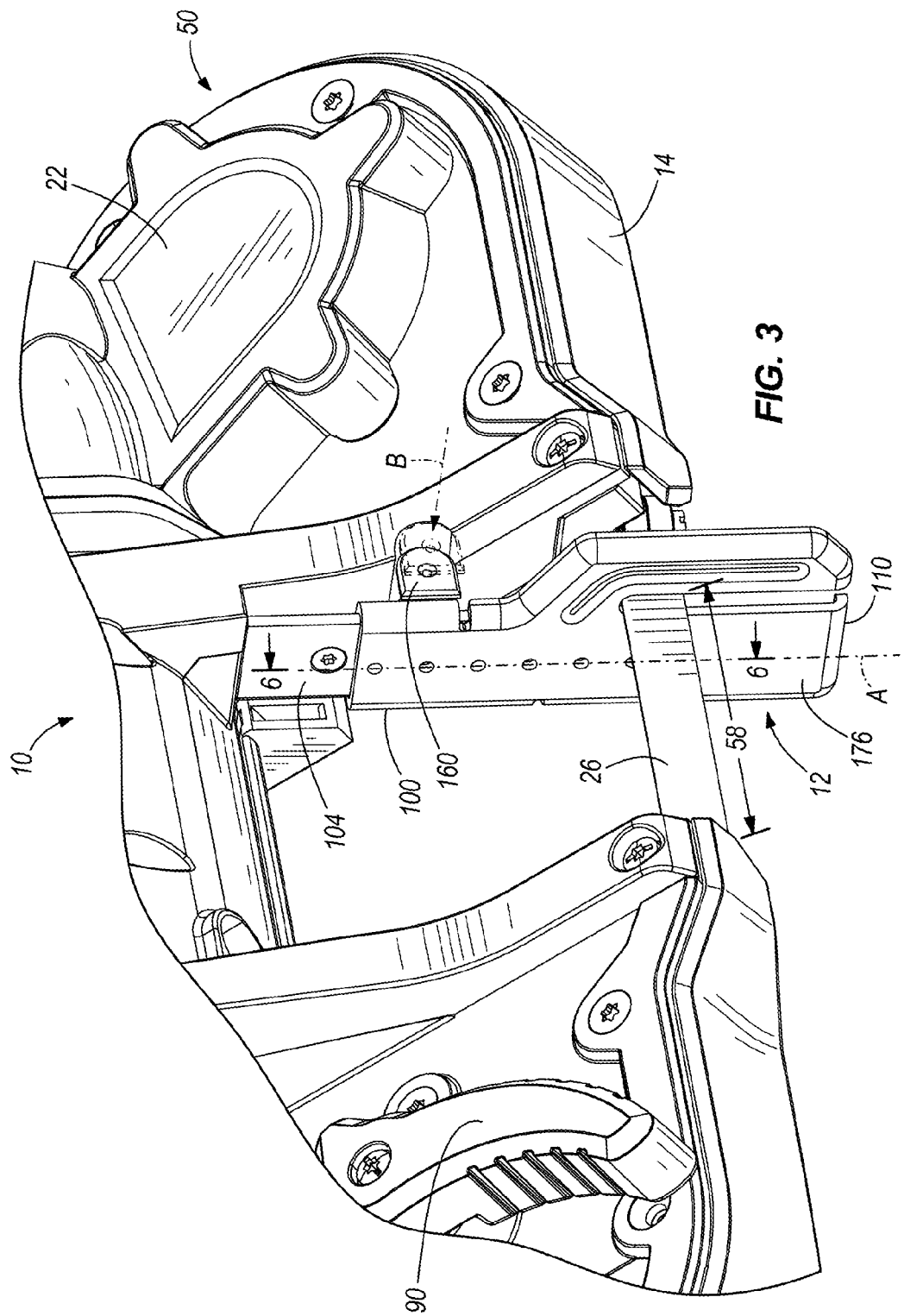
FIG. 3 is a close-up perspective view of a portion of the band saw of FIG. 1.

The shoe 100 includes a generally C-shaped body member 172 and a workpiece-engaging member 176. The body member 172 wraps around and slideably engages the first and second extending portions 124, 128 of the connector block 104. An axis A of the adjustable shoe system 12 is parallel to the direction the shoe 100 slides relative to the connector block 104 and is defined by a longitudinal axis of the connector block 104. In the illustrated construction, the apertures 132 and the fastener apertures 116 are centered on the axis A. The workpiece-engaging member 176 generally extends along the axis A below the cut zone 58 and away from the housing 14 of the band saw 10 (FIG. 3). The shoe 100, and in particular the workpiece-engaging member 176, engages a workpiece (not shown) in order to secure the workpiece relative to the band saw blade 26 within the cut zone 58 during a cutting operation. The workpiece-engaging member 176 includes a groove or slot 180 in which the band saw blade 26 is positioned, as shown in FIGS. 1-3. The direction of movement of the band saw blade 26 through the slot 180 is generally perpendicular to the axis A, and a plane of the band saw blade 26 extending through the slot 180 is generally parallel to the axis A.

The shoe 100 also includes apertures 184a-184f for receiving the locking balls 136 in order to lock the shoe 100 in position relative to the housing 14, i.e., the locked position (FIG. 7). The locking balls 136 are urged toward the shoe 100 by the biasing member 152 when the locking rod is in the locked position, as described above. In the locked position, the locking balls 136 are seated in the apertures 132 of the connector block 104 such that a portion of the locking balls 136 cross the plane of an exterior surface 188 of the connector block 104 adjacent the shoe 100. Thus, said portion of the locking balls 136 protrudes from the exterior surface 188 toward the shoe 100. Respective apertures 184a-184f in the shoe 100 receive said portion of the locking balls 136, which are locked in place by the force of the locking rod 148, to fixedly hold the shoe 100 in a position corresponding to the respective apertures 184a-184f. In the illustrated construction, the shoe 100 includes six apertures 184a-184f and is adjustable between first, second, third and fourth positions.

The first position is an extended position (shown in FIG. 7) in which the shoe 100 extends away from the housing 14 for accommodating larger workpieces. In the first position, the locking balls 136 are received by the apertures 184a and 184c. The second, third and fourth positions are recessed positions (i.e., toward the housing 14) for accommodating smaller workpieces or cutting flush against a surface, such as a ceiling or wall. The third position is more recessed than the second position, and the fourth position is more recessed than the third position. In the second position, the locking balls 136 are received by the apertures 184b and 184d. In the third position, the locking balls 136 are received by the apertures 184c and 184e. In the fourth position, the locking balls 136 are received by the apertures 184d and 184f. In the fourth position, or fully recessed position, the end of the shoe 110 is adjacent or near a bottom edge (i.e., the cutting edge) of the band saw blade 26.

Non-engaged positions, or intermediate positions, include positions in between the first, second, third and fourth positions. In the non-engaged position shown in FIG. 8, the locking balls 136 are not received by the apertures 184a-184f. The non-engaged position may also include a position in which the shoe 100 is removed from the connector block 104. In other constructions, fewer or more apertures 184a-184f may be employed such that the shoe 100 is adjustable between fewer or more positions for positioning and securing the band saw 10 with respect to a variety of workpieces of varying sizes and shapes.

In operation, the locking rod 148 is biased to an extended, or locked, position by the compression spring 156 in which the large diameter portion 168 exerts a force on the biasing member 152 toward the connector block 104. The force pushes the locking balls 136 toward the shoe 100 such that when the locking balls 136 are received by the respective apertures 184a-184f in the shoe 100, the locking balls 136 are trapped between the biasing member 152 and the shoe 100. In the locked position, the shoe 100 is inhibited from movement relative to the connector block 104 or the housing 14.

In order to adjust the position of the shoe 100, a user applies a force to the button 160 in a direction perpendicular to the axis A and toward the connector block 104, as shown by the arrow B in FIG. 3. The force causes the locking rod 148 to move from the extended position, in which the large diameter portion 168 is adjacent the biasing member 152, to an unlocked, or recessed, position, in which the small diameter portion 164 is adjacent the biasing member 152. In the unlocked position, the small diameter portion 164 provides a clearance that alleviates or removes the force on the biasing member 152, which allows the locking balls 136 to be released from the respective apertures 184a-184f such that the shoe 100 is movable relative to the connector block 104. The locking balls 136 slide relative to an inner surface 192 of the shoe 100, which faces the exterior surface 188 of the connector block 104, as shown in FIG. 8. The user applies a moving force while sliding the shoe 100 in a direction parallel to the axis A and releases the button 160 when a desired position is reached. The tapered portion 166 allows the locking rod 148 to transition smoothly such that the large diameter portion 168 can re-engage the biasing member 152. Upon release of the button 160, the user must find a position in which the locking balls 136 are received by the respective apertures 184a-184f to lock the shoe 100 in place. The button 160 and locking rod 148 are biased to the locked position by the compression spring 156 such that, upon release of the button 160, the button 160 moves to the extended, or locked, position. Thus, the shoe 100 is locked in place when the button 160 is released.

No tools or removal of fasteners are required to adjust or remove the shoe 100, and the button 160 is deliberately depressed in order to move the shoe 100. However, if the shoe is unintentionally overloaded, the biasing member 152 is flexible and can bend to prevent damage to the shoe 100 and the detent mechanism 108.

In other constructions, the locking rod may be rotatable for one-handed operation and include a non-circular cross section, such as a semi-circular cross section, such that the rod engages the biasing member 152 in one angular position and releases the biasing member 152 in another angular position. In yet other constructions, the locking rod may be a ramped pin and a second locking ball may replace the biasing member 152 adjacent the first locking ball such that when one end of the ramp is adjacent the locking balls, a space is provided such that the shoe 100 is movable with respect to the connector block 104, and when an opposite end of the ramp is adjacent the locking balls, the locking balls are trapped to lock the shoe 100 with respect to the connector block 104. In this construction, an optional biasing member and detent ball may be provided, independent from the functional locking balls described above, to be positioned in a second of the apertures 184a-184f to stabilize the shoe 100 and provide a detent-like feel to the user.

FIGS. 9-13 illustrate another construction of a toolless adjustable shoe system 12a. The shoe system 12a has a shoe 100a for positioning against the workpiece, a connector block 104a for coupling the shoe 100a to the housing 14, and a locking mechanism 108a for locking the shoe 100a in select positions relative to the connector block 104a. The shoe 100a includes a distal end 110a having a distance from the connector block 104a that varies depending on the position of the shoe 100a. The shoe 100a is coupled to the housing 14 by way of the connector block 104a and the locking mechanism 108a.

Figure 10:
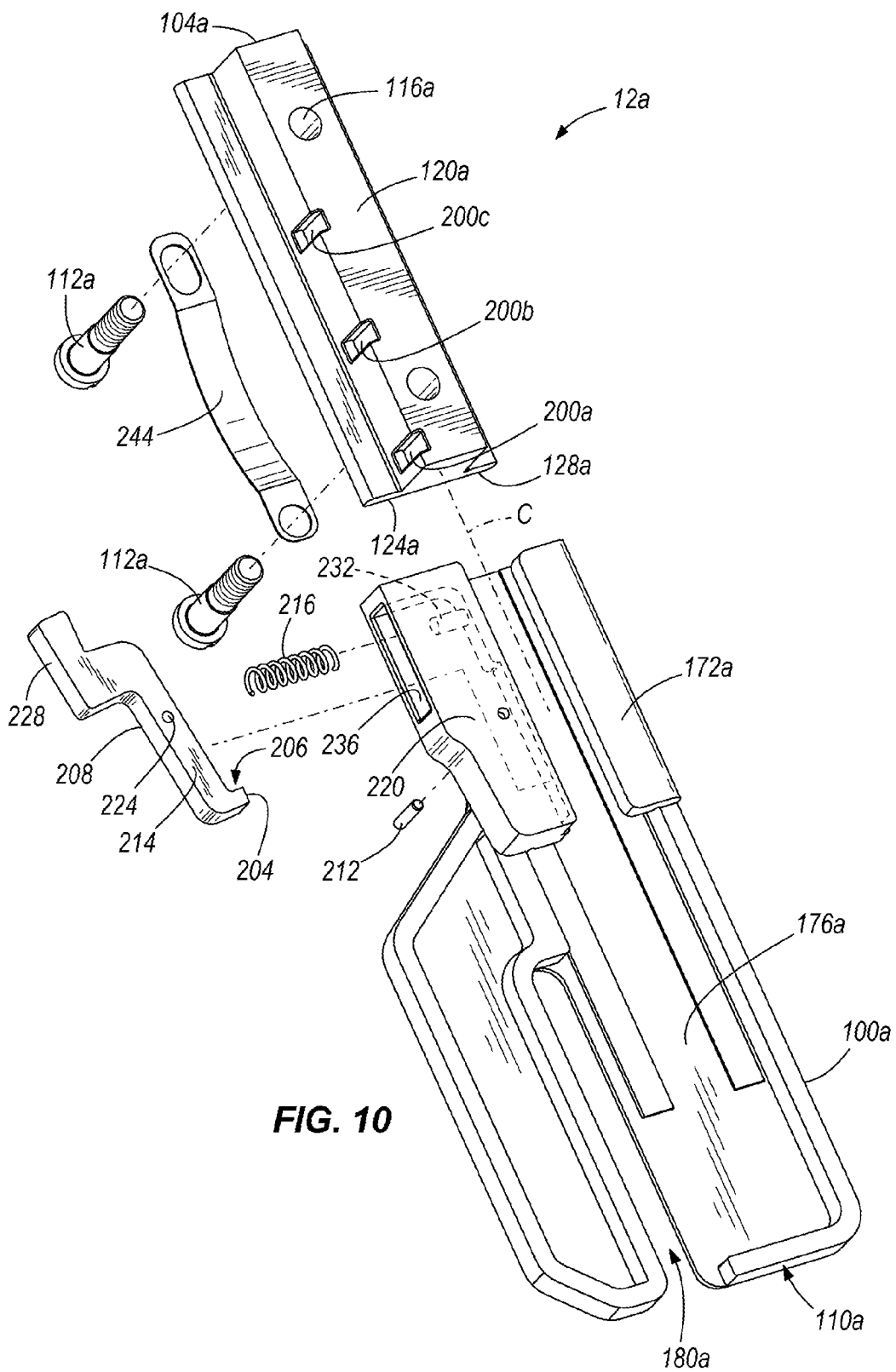
FIG. 10 is an exploded view of the adjustable locking shoe system of FIG. 9.
Figure 11:
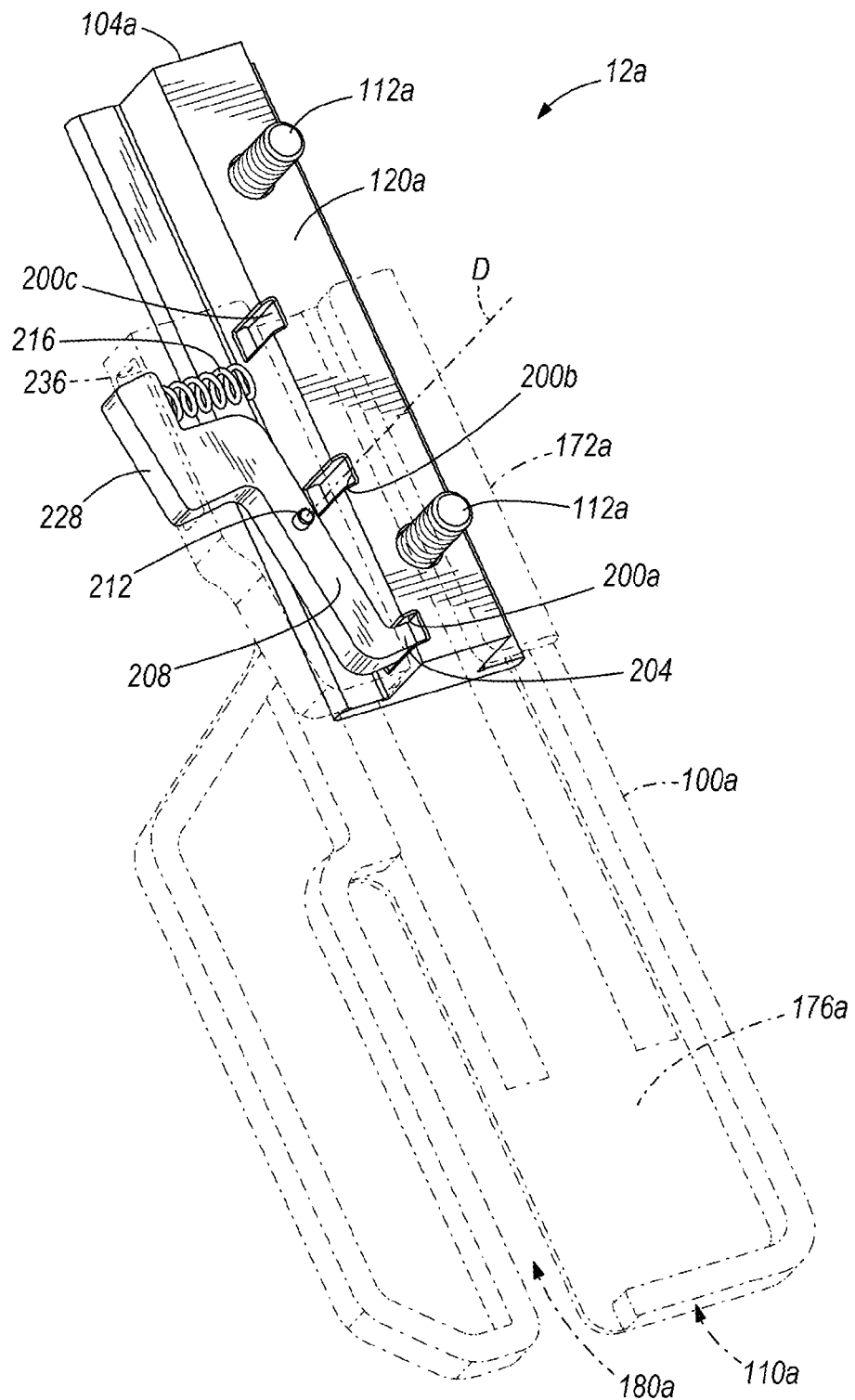
FIG. 11 is a rear perspective view of the adjustable locking shoe system of FIG. 9 in a locked position.
Figure 12:
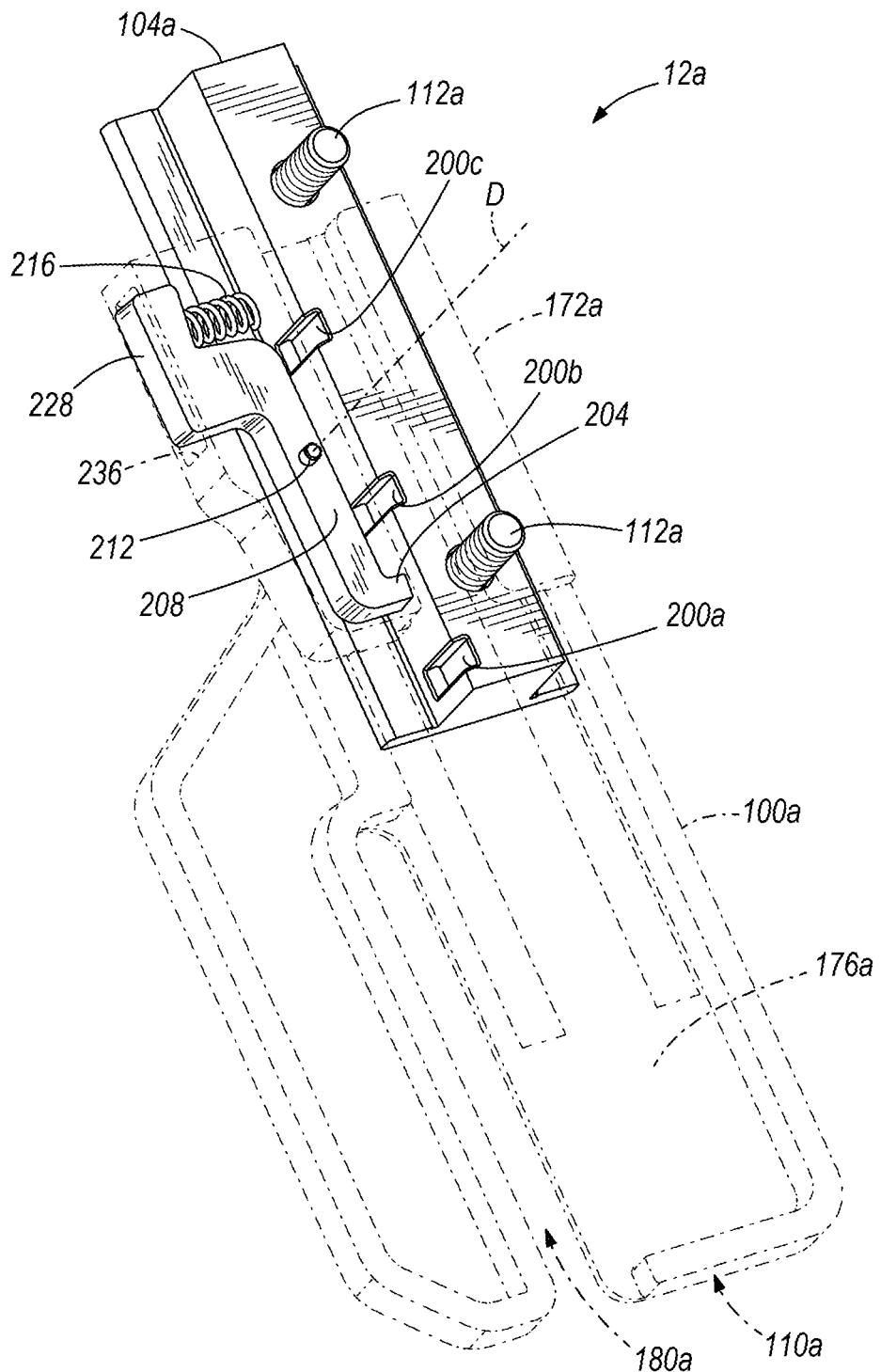
FIG. 12 is a rear perspective view of the adjustable locking shoe system of FIG. 9 in an unlocked position.
Figure 13:
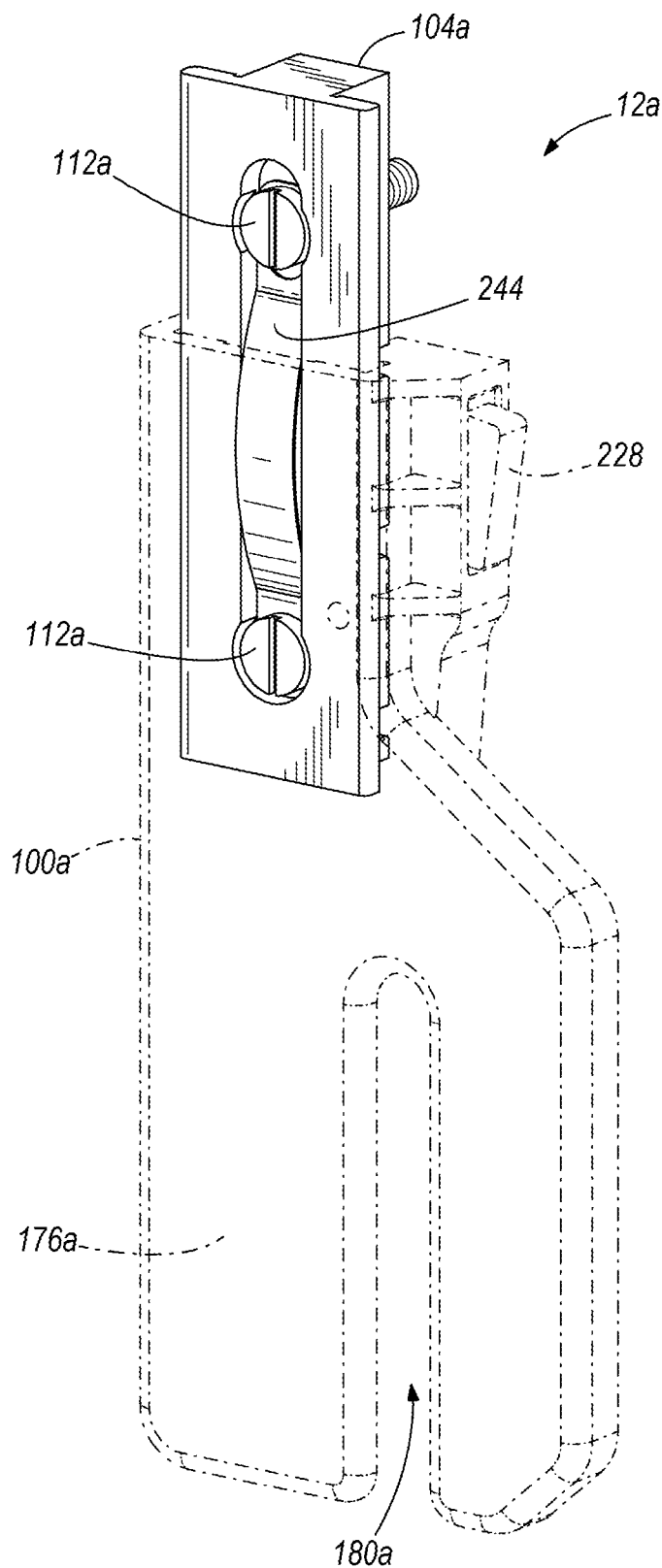
FIG. 13 is a front perspective view of the adjustable locking shoe system of FIG. 9.

The connector block 104a is a generally T-shaped member coupled to the housing 14 by fasteners 112a, as described above with respect to the connector block 104. The connector block 104a includes a main body portion 120a and first and second extending portions or flanges 124a, 128a generally forming a T-shape, as shown in FIG. 10. In the illustrated construction, the main body portion 120a is positioned adjacent the housing 14 and engages the housing 14 when the connector block 104a is fastened to the housing 14. An opposite side 240 of the connector block 104a includes a biasing member 244, such as a leaf spring, to provide a force on the side of the shoe 100a facing the opposite side 240 of the connector block 104a, as is best illustrated in FIG. 13. The leaf spring 244 provides pressure on the back of the shoe 100a to inhibit the shoe 100a from wobbling transverse to the axis C with respect to the connector block 104a. The leaf spring 244 includes apertures at each end through which the fasteners 112a pass to secure the leaf spring 244 to the connector block 104a.

The first and second extending portions 124a, 128a of the connector block 104a mate with the shoe 100a, as described above with respect to the first construction of the shoe system 12. The main body portion 120a of the connector block 104a also includes recesses 200a-200c for receiving a locking portion 204 of a lever 208 to lock the shoe 100a in place relative to the connector block 104a. In the illustrated construction, three recesses 200a-200c are employed, resulting in three positions in which the shoe 100a can be locked. In other constructions, one, two, four or more recesses may be employed to allow for one, two four or more positions in which the shoe 100a can be locked.

The first position is an extended position (shown in FIG. 9) in which the shoe 100a extends away from the housing 14 for accommodating larger workpieces. In the first position, the locking portion 204 of the lever 208 engages the lower recess 200a. The second and third positions are recessed positions (i.e., toward the housing 14) for accommodating smaller workpieces or cutting flush against a surface, such as a ceiling or wall. The third position is more recessed than the second position. In the second position, the locking portion 204 of the lever 208 engages the middle recess 200b. In the third position (shown in phantom in FIG. 9), the locking portion 204 of the lever 208 engages the upper recess 200c. In the third position, or fully recessed position, the end of the shoe 110a is adjacent or near a bottom edge (i.e., the cutting edge) of the band saw blade 26.

The locking mechanism 108a includes the lever 208, the recesses 200a-200c, a pivot pin 212, a biasing member 216, such as a compression spring, and a lever housing 220. The lever 208 includes the locking portion 204, a pivot aperture 224, and a button 228. The biasing member 216 is received in the button 228 at one end and coupled to a pin 232 within the lever housing 220 at another end and provides a force that biases the button 228 to a locked position (FIG. 11) positioned away from the connector block 104a. In the locked position, the button 228 extends out of an opening 236 in the lever housing 220. The lever 208 is pivoted about the pivot pin 212 such that the locking portion 204 is disposed in one of the recesses 200a-200c to inhibit movement of the shoe 100a relative to the connector block 104a. In an unlocked position (FIG. 12), the button 228 is closer to the housing than in the locked position and is parallel to and nearly flush with the opening 236 in the lever housing 220. The lever 208 is pivoted about the pin 212 such that the locking portion 204 slides along the main body portion 120a of the connector block 104a between recesses 200a-200c. In the unlocked position, the shoe 100a and locking mechanism 108a are moveable relative to the connector block 104a.

The pivot pin 212 defines a pivot axis D that is non-parallel to, and more specifically, perpendicular to the longitudinal axis C of the connector block 104a. The lever 208 defines a longitudinal axis E (FIGS. 14-15) through a longitudinal portion 214 of the lever 208. The pivot axis D passes through longitudinal portion 214 and is perpendicular to and intersects the longitudinal axis E.

Figure 15:
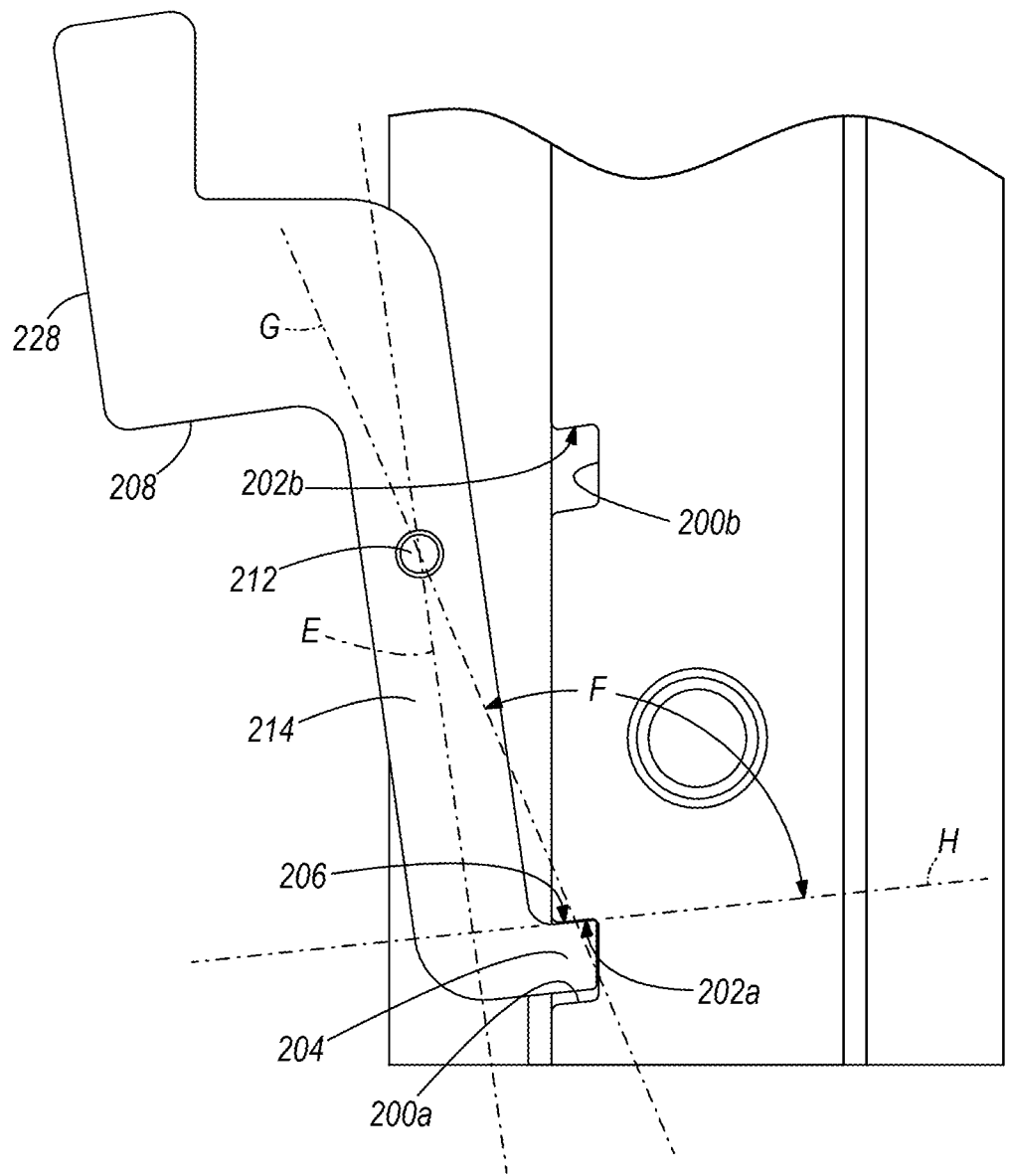
FIG. 15 is an isolated view of the lever and connector block shown in FIG. 14.

In the locked position, shown in FIG. 15, an axis G is defined between the pivot point of the pivot pin 212 and the ramped surface 206 of the locking portion 204, preferably to an approximate center point on the ramped surface 206, as illustrated. The axis G is perpendicular to the pivot axis D.

Figure 14:
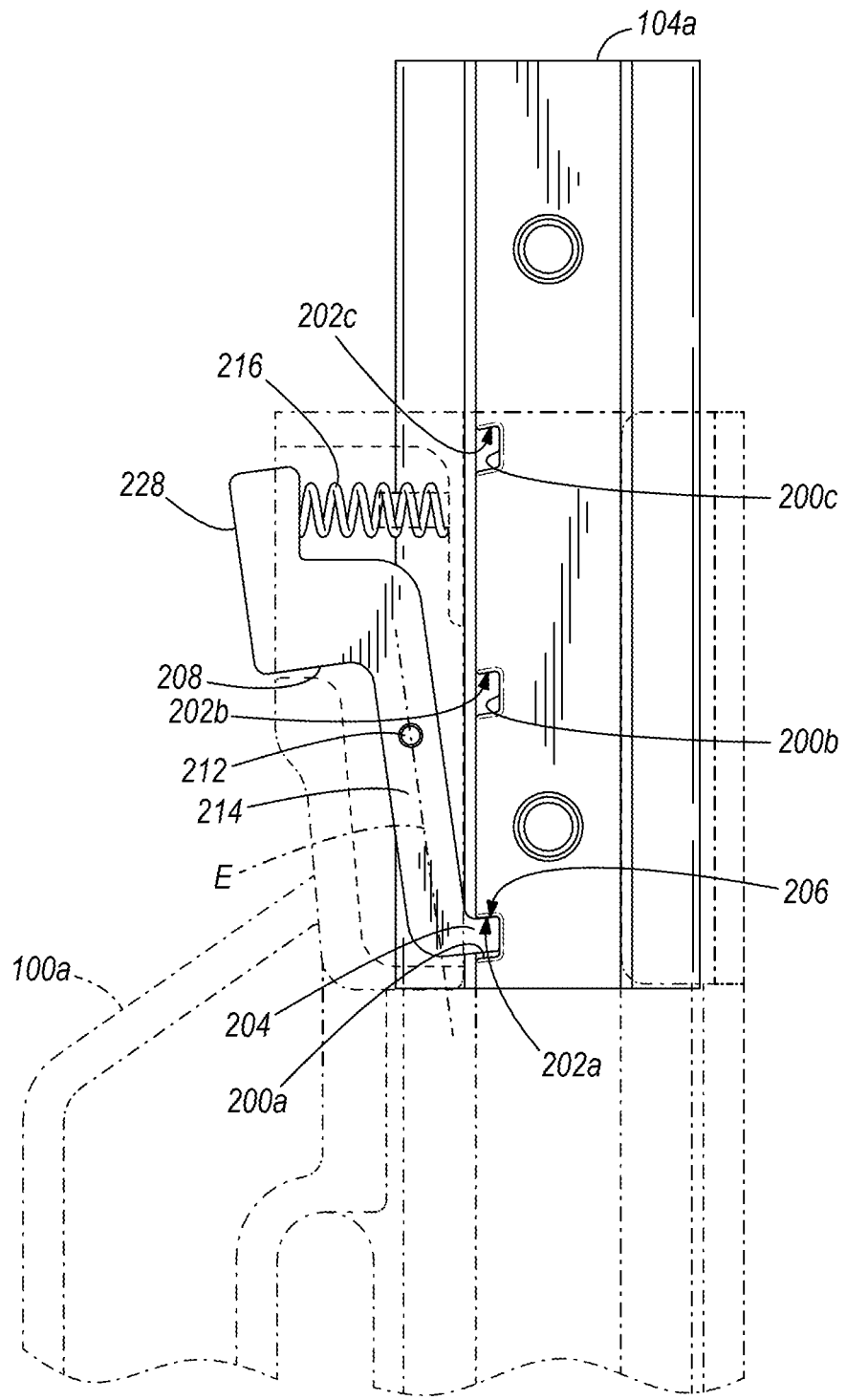
FIG. 14 is a rear view of a portion of the adjustable locking shoe system of FIG. 11.

With reference to FIGS. 14-15, the recesses 200a-200c are generally parallelepiped in shape having at least one ramped surface 202a-202c, i.e., a surface that forms an angle F greater than 90 degrees with respect to the axis G when the locking portion 204 is received in one of the recesses 200a-200c. The ramped surface 202a-202c engages a ramped surface 206 on the locking portion 204 of the lever 208.

The ramped surface 206 of the locking portion 204 defines an axis H that forms the same angle F, greater than 90 degrees, with respect to the axis G. The locking portion 204 of the lever 208 and the recesses 200a-200c are ramped to allow for overload of the shoe assembly 12a if, for example, the band saw is dropped. When overloaded, the opposing ramped surfaces 206, 202a-202c on the locking portion 204 and respective recess 200a-200c allow the locking mechanism 108a to release, such that the locking portion 204 is released from the respective recess 200a-200c and the shoe 100a slides upward relative to the connector block 104a to avoid damage.

In the illustrated construction, the lever housing 220 is formed as one piece with the shoe 100a, such as by investment casting. In other constructions, the lever housing 220 can be formed separately from the shoe 100a and may be made of a plastic.

The shoe 100a includes a generally C-shaped body member 172a and a workpiece-engaging member 176a, as described above with respect to the shoe 100. The body member 172a wraps around and slideably engages the first and second extending portions 124a, 128a of the connector block 104a. The axis C of the adjustable shoe system 12a is parallel to the direction the shoe 100a slides relative to the connector block 104a and is defined by the longitudinal axis of the connector block 104a. In the illustrated construction, fastener apertures 116a are centered on the axis C, and the recesses extend into the main body portion 120a in a direction transverse to the axis C.

Figure 9:
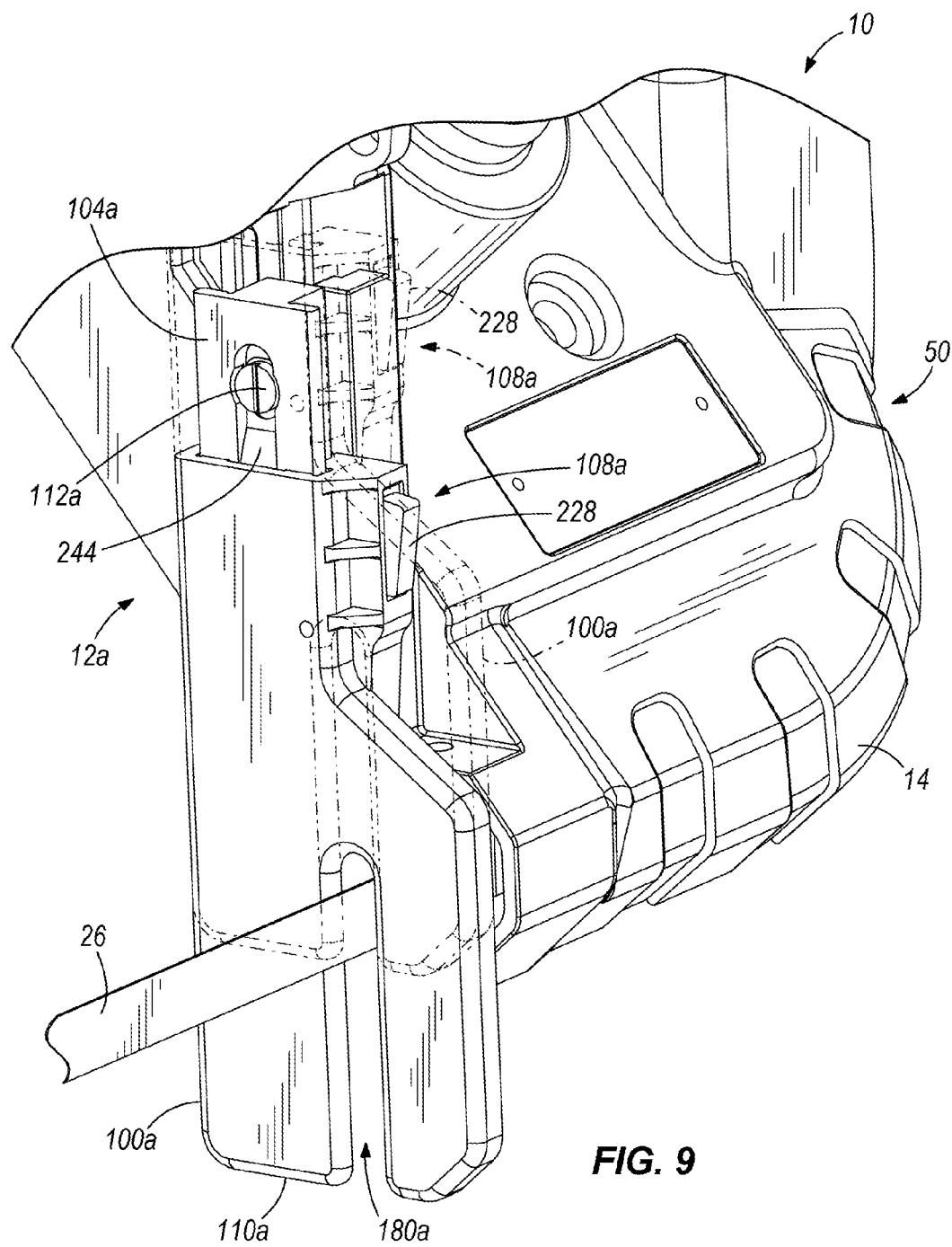
FIG. 9 is a perspective view of a portion of a band saw including an adjustable locking shoe system according to another construction of the invention.

The workpiece-engaging member 176a generally extends along the axis C below the cut zone 58 and away from the housing 14 of the band saw 10 (FIG. 9). The shoe 100a, and in particular the workpiece-engaging member 176a, engages a workpiece (not shown) in order to secure the workpiece relative to the band saw blade 26 within the cut zone 58 during a cutting operation. The workpiece-engaging member 176a includes a groove or slot 180a in which the band saw blade 26 is positioned. The direction of movement of the band saw blade 26 through the slot 180a is generally perpendicular to the axis C, and a plane of the band saw blade 26 extending through the slot 180a is generally parallel to the axis C.

Non-engaged positions, or intermediate positions, include positions in between the first, second and third positions. In the non-engaged position shown in FIG. 12, the locking portion 204 of the lever 208 engages a side of the main body portion 120a. The non-engaged position may also include a position in which the shoe 100a is removed from the connector block 104a. In other constructions, fewer or more recesses 200a-200c may be employed such that the shoe 100a is adjustable between fewer or more positions for positioning and securing the band saw 10 with respect to a variety of workpieces of varying sizes and shapes.

In operation, the button 228 is biased to an extended, or locked, position by the compression spring 216. The force pushes the locking portion 204 toward the recesses 200a-200c in the connector block 104a such that the locking portion 204 is biased into an adjacent recess 200a-200c. In the locked position, the shoe 100 is inhibited from movement relative to the connector block 104 or the housing 14.

In order to adjust the position of the shoe 100a, a user may single-handedly apply a force to the button 228 in a direction perpendicular to the axis C and toward the connector block 104 and then slide the shoe 100a and locking mechanism 108a up or down between the extended and recessed positions. The force causes the locking portion 204 to move from a locked position, in which the locking portion 204 abuts one of the recesses 200a-200c, to an unlocked position, in which the locking portion 204 disengages the recess 200a-200c and is slidable relative to the connector block 104a in a direction parallel to the axis C. The user applies a moving force while sliding the shoe 100a in a direction parallel to the axis C and releases the button 228 when an approximate desired position is reached. The button 228 may also be released at any time and the shoe 100a will remain movable until the locking portion 204 snaps into an adjacent recess 200a-200c. Upon release of the button 228, the user must find a position in which the locking portion 204 is received by one of the respective recesses 200a-200c to lock the shoe 100a in place. The button 228 locking portion 204 are biased to the locked position by the compression spring 216 such that, upon release of the button 228 and the locking portion 204 engaging a recess 200a-200c, the button 228 moves to the locked position. Thus, the shoe 100a is locked in place when the button 228 is released and the locking portion 204 is positioned in a recess 200a-200c.

No tools or removal of fasteners are required to adjust or remove the shoe 100a, the button 228 is deliberately depressed in order to move the shoe 100a, and the shoe 100a can be adjusted with one-handed operation. However, if the shoe is unintentionally overloaded, the locking portion 204 can move to the unlocked position by affecting movement between the ramped surfaces to prevent damage to the shoe 100a and the locking mechanism 108a.

Although particular constructions embodying independent aspects of the invention have been shown and described, other alternative constructions will become apparent to those skilled in the art and are within the intended scope of the independent aspects of the invention.

Thus, the invention provides, among other things, an adjustable locking shoe for a band saw. Various features and advantages of the invention are set forth in the following claims.

What is claimed is:

1. A shoe for a band saw, the shoe comprising:
   a block for coupling to the band saw, the block including an aperture;
   a locking ball disposed in the aperture;
   a body including a first surface for engaging a workpiece and a second surface directly opposite the first surface having a plurality of apertures;
   a locking rod coupled to the block and movable between a first position and a second position,
   wherein the locking ball is received in one of the plurality of apertures of the body when the locking rod is in the first position such that the body is substantially fixed relative to the block, and
   wherein the body is movable relative to the block when the locking rod is in the second position; and
   a biasing member disposed between the locking rod and the block, wherein the locking rod applies a force to the biasing member to hold the locking ball in one of the plurality of apertures when the locking rod is in the first position.

2. The shoe of claim 1, wherein the locking rod includes a first diameter portion and a second diameter portion that has a smaller diameter than the first diameter portion, wherein the first diameter portion engages the biasing member to apply the force to the biasing member when the locking rod is in the first position.

3. The shoe of claim 2, wherein the second diameter portion is positioned proximate the biasing member when the locking rod is in the second position to release the force on the biasing member and release the locking ball from engagement in the one of the apertures in the body.

4. The shoe of claim 1, wherein the biasing member includes a leaf spring having a first portion for engaging the locking rod and a second portion for engaging the locking ball.

5. The shoe of claim 4, wherein the locking ball is a first locking ball and the aperture is a first aperture, the block further including a second aperture and the shoe further comprising a second locking ball disposed in the second aperture, wherein the biasing member further includes a third portion for engaging the second locking ball.

6. The shoe of claim 5, wherein the first portion of the biasing member is positioned between the second portion and the third portion.

7. The shoe of claim 1, wherein the locking rod translates axially between the first and second positions.

8. The shoe of claim 7, wherein the body is movable in an axial direction that is substantially perpendicular to the axial translation of the locking rod.

9. The shoe of claim 7, wherein the locking rod includes a distal end that extends from the block a first distance in the first position and a second distance in the second position, wherein the first distance is greater than the second distance.

10. The shoe of claim 1, further comprising a compression spring disposed around the locking rod to bias the locking rod to the first position.

11. The shoe of claim 1, wherein the body is movable in a direction with respect to the block, and wherein the body is movable from a first position to a second position relative to the block when an overloaded force is applied to the body in the direction of movement of the body.

12. A band saw comprising:
a housing supporting a motor operable to drive a continuous band saw blade to cut a workpiece, the housing having a first portion and a second portion;
a cavity between the first portion and the second portion for receiving the continuous band saw blade and accommodating a workpiece during a cutting operation; and
a shoe assembly coupled adjacent the cavity to the first portion of the housing, the shoe assembly comprising,
a first locking ball and a second locking ball;
a body including a first surface for engaging a workpiece, an opposite surface having a plurality of apertures, and a recess through which the band saw blade passes;
a locking rod movable between a first position and a second position; and
a biasing member disposed between the locking rod and the housing, wherein the biasing member includes a leaf spring having a first portion for engaging the locking rod, a second portion for engaging the first locking ball, and a third portion for engaging the second locking ball;
wherein at least the first locking ball is received in one of the plurality of apertures of the body when the locking rod is in the first position such that the body is substantially fixed relative to the housing,
wherein the locking rod applies a force to the biasing member to hold the first locking ball in the aperture when the locking rod is in the first position, and
wherein the body is movable relative to the housing when the locking rod is in the second position.

13. The band saw of claim 12, wherein the locking rod includes a first diameter portion and a second diameter portion that has a smaller diameter than the first diameter portion, wherein the first diameter portion engages the biasing member to apply the force to the biasing member when the locking rod is in the first position.

14. The band saw of claim 13, wherein the second diameter portion is positioned proximate the biasing member when the locking rod is in the second position to release the force on the biasing member and release the first locking ball from engagement in the one of the apertures in the body.

15. The band saw of claim 12, wherein the first portion of the biasing member is positioned between the second portion and the third portion.

16. The band saw of claim 12, wherein the locking rod translates axially between the first and second positions.

17. The band saw of claim 16, wherein the body is movable in an axial direction that is substantially perpendicular to the axial translation of the locking rod.

18. The band saw of claim 12, further comprising a compression spring disposed around the locking rod to bias the locking rod to the first position.

19. The band saw of claim 12, wherein the portion of the band saw blade located in the cavity defines a longitudinal axis, and wherein the body is movable in an axial direction substantially perpendicular to the longitudinal axis of the blade.

20. The band saw of claim 12, wherein the body is movable in a direction with respect to the housing, and wherein the biasing member is configured to bend to allow the body to move from a first position to a second position relative to the housing when an overloaded force is applied to the body in the direction of movement of the body.

* * * * *